April 18, 1967 H. A. OLDENKAMP ETAL 3,314,462
METHOD OF SECTIONIZING CITRUS FRUIT
Original Filed May 25, 1961 6 Sheets-Sheet 1
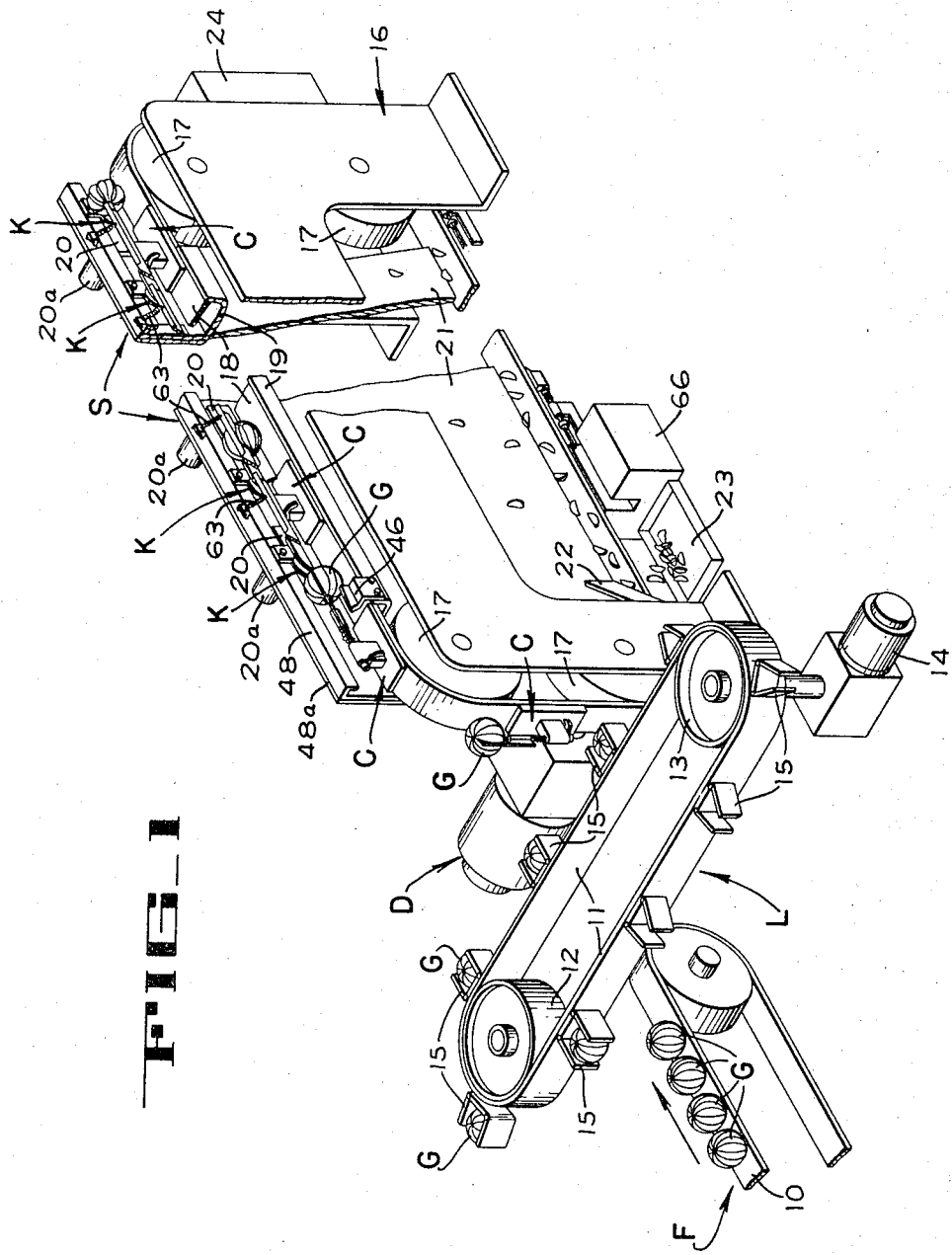
INVENTORS
HENRY A. OLDENKAMP
WILLIAM J. ADAMS, JR.
BY Francis W. Anderson
ATTORNEY

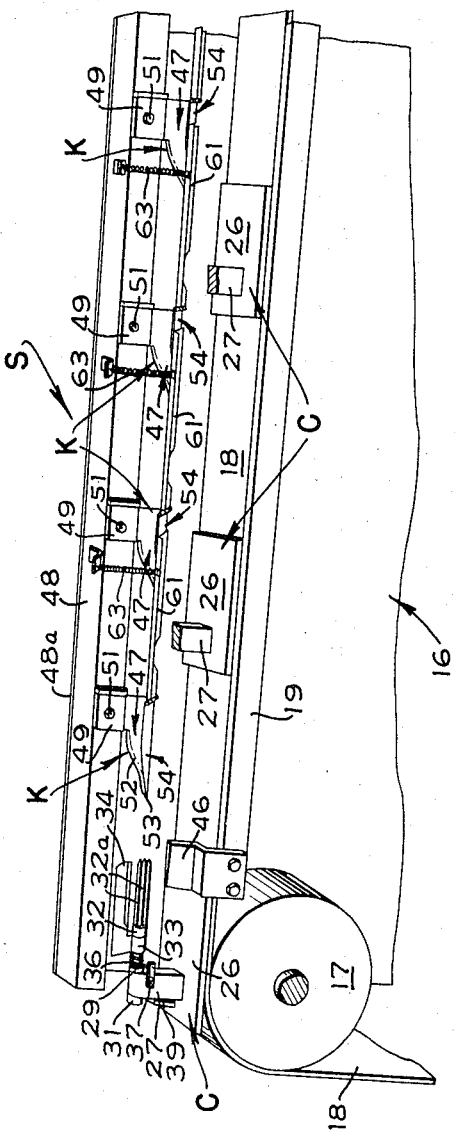

April 18, 1967    H. A. OLDENKAMP ETAL    3,314,462
METHOD OF SECTIONIZING CITRUS FRUIT
Original Filed May 25, 1961    6 Sheets-Sheet 3
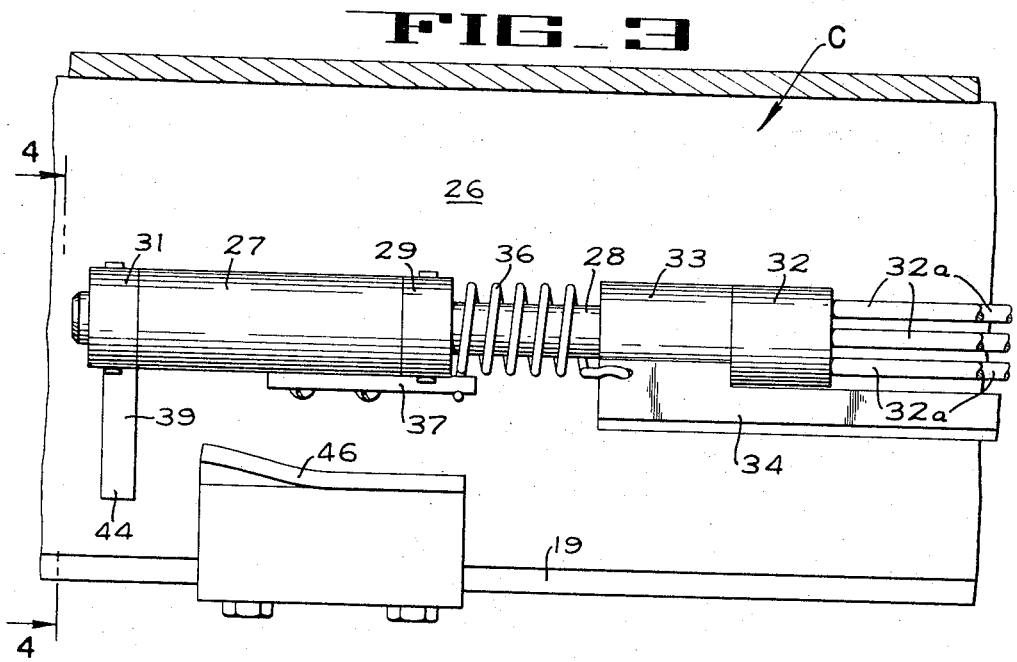
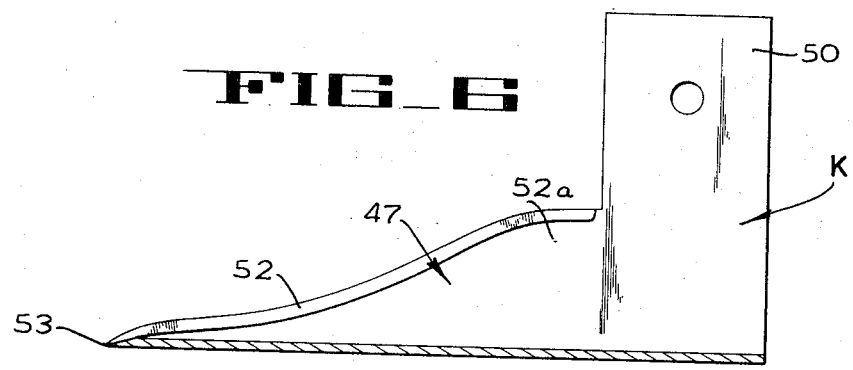
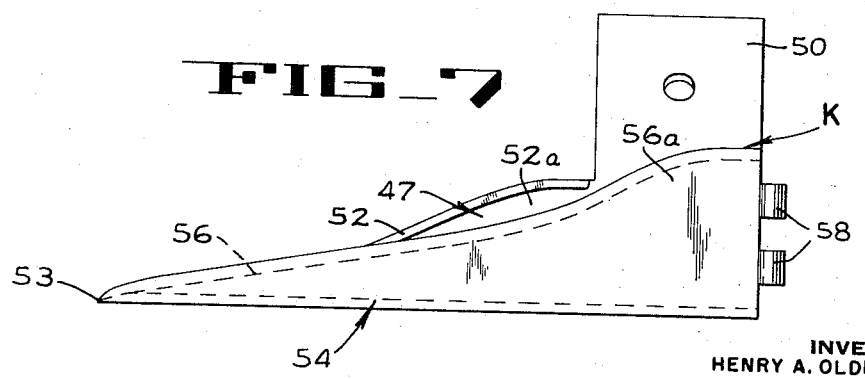
INVENTORS
HENRY A. OLDENKAMP
WILLIAM J. ADAMS, JR.
BY Francis W. Anderson
ATTORNEY April 18, 1967     H. A. OLDENKAMP ET AL     3,314,462
METHOD OF SECTIONIZING CITRUS FRUIT
Original Filed May 25, 1961     6 Sheets-Sheet 4
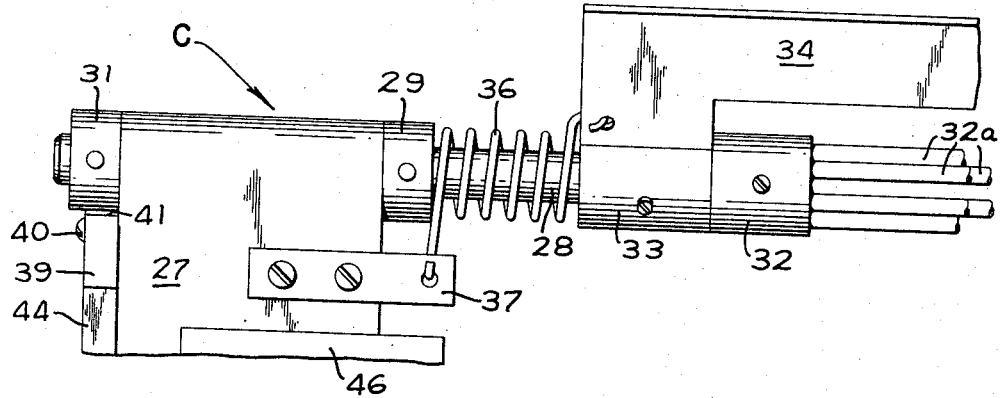
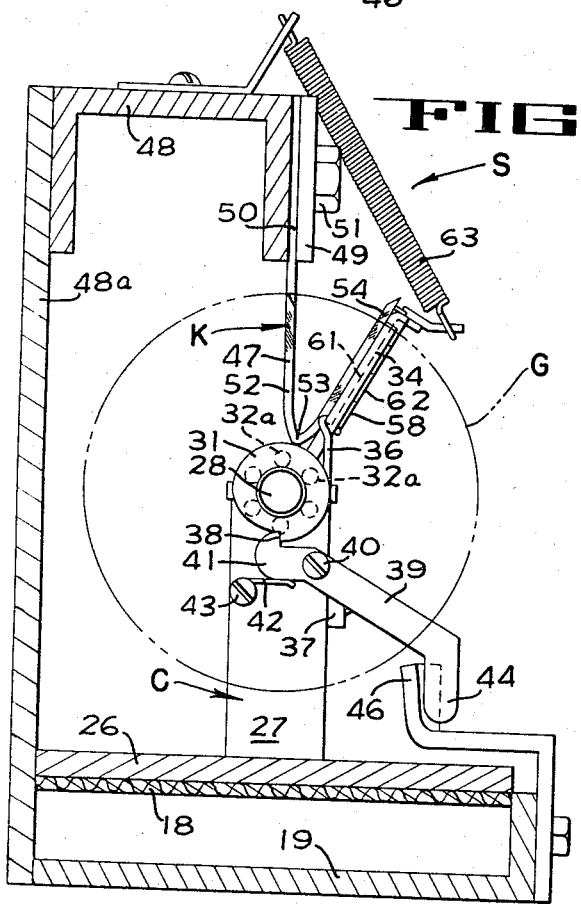
INVENTORS
HENRY A. OLDENKAMP
WILLIAM J. ADAMS, JR.
BY Francis W. Anderson
ATTORNEY

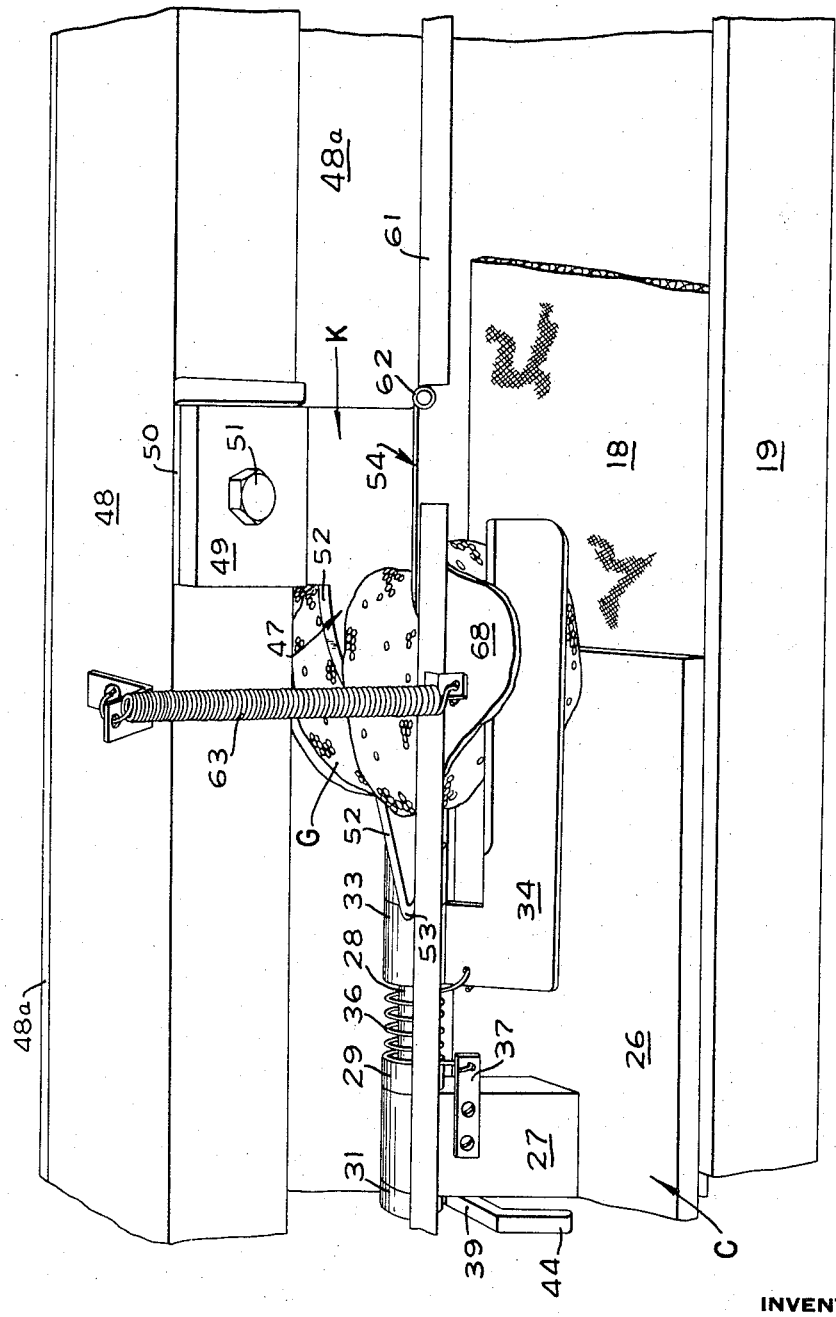

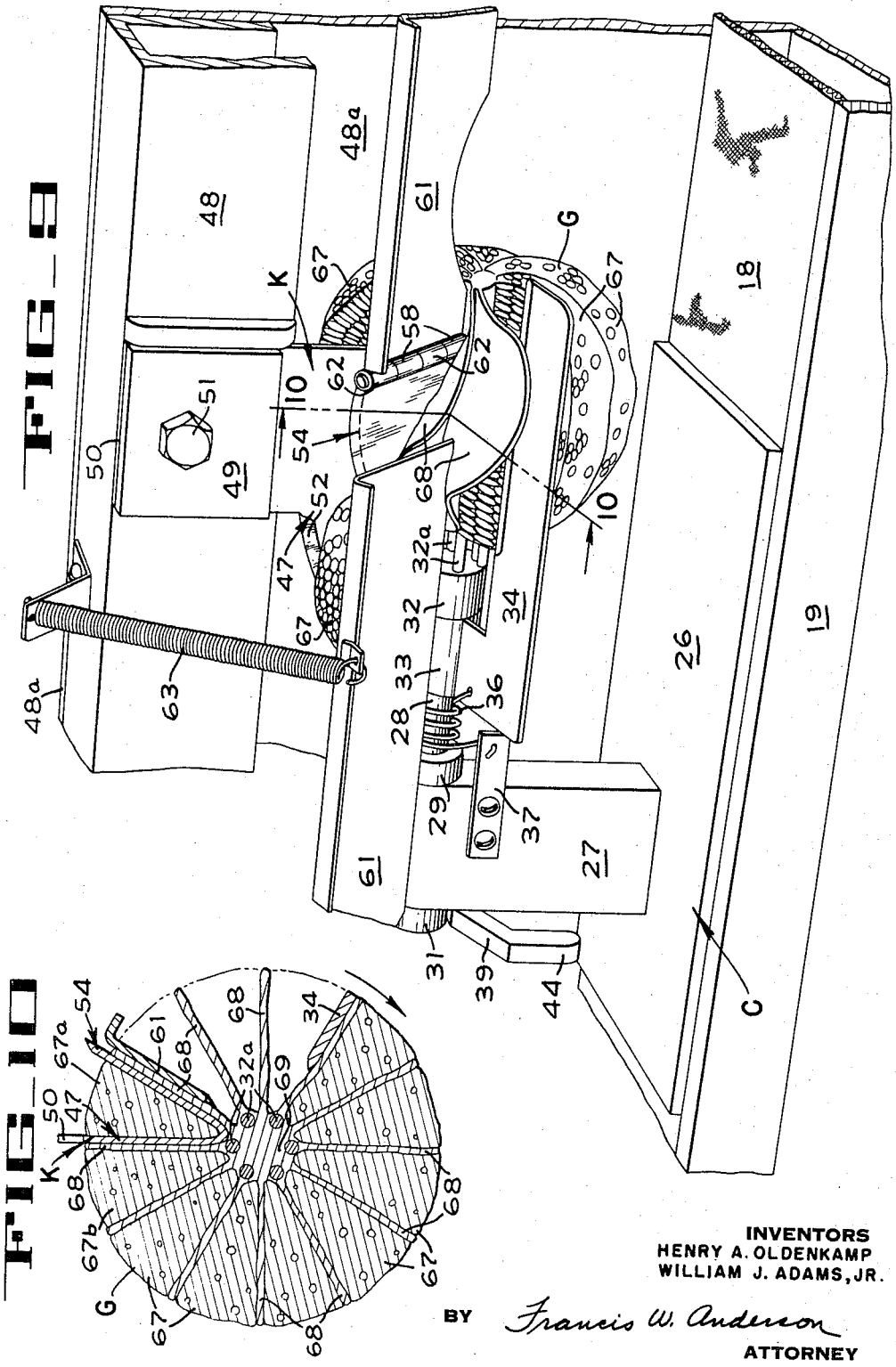

United States Patent Office 3,314,462
Patented Apr. 18, 1967

3,314,462
METHOD OF SECTIONIZING CITRUS FRUIT
Henry A. Oldenkamp, Saratoga, and William J. Adams, Jr., San Jose, Calif., assignors to FMC Corporation, a corporation of Delaware
Original application May 25, 1961, Ser. No. 112,673, now Patent No. 3,172,440, dated Mar. 9, 1965. Divided and this application Feb. 10, 1964, Ser. No. 349,522
4 Claims. (Cl. 146—236)

This invention relates to the part of sectionizing peeled citrus fruit in order to separate the juice cell groups or segments of such fruit from the intervening membranes or integuments. More particularly, this invention pertains to an improved method for sectionizing citrus fruit by means of a straight line, continuous movement of the sectionizing blades. This application is a division of our copending application, Ser. No. 112,673, filed May 25, 1961, now Patent No. 3,172,440, and claiming the apparatus. Such sectionizing operations are most commonly performed upon grapefruit, but oranges and other citrus fruit can also be similarly treated.

Various hand tools have been proposed for removing the segments from their membranes individually, but the use of such tools has required hand labor rendering the resulting production slow and costly. In order to overcome such difficulties, power operated tools have been proposed for removing a number of segments simultaneously. In one proposed machine, a plurality of knives are simultaneously inserted along the core of the fruit, whereupon the knives are radially expanded to free all of the segments, or half of the segments, from their associated membranes. Since the number of segments in a fruit is not fixed, but varies with individual fruit, a compromise must be made in the selection of the number of knives to be incorporated in the tool. Another deficiency of expanding knife devices is that they sever only one side of the segments from the membranes, and hence two operations are required if both sides of the segments are to be severed from the membranes. If prior devices of the type referred to are incorporated in an automatic machine, they require a complicated, slowly operated turret type structure.

An object of the present invention is to accomplish a continuous, progressive, and automatic segmenting operation that separates both sides of each segment from the associated membranes.

Another object is to separate all of the segments of each fruit, regardless of the fact that all fruit do not have the same number of segments.

The manner in which these and other objects are attained by the invention will first be described briefly. In accordance with the present invention, a row or line of spaced V-shaped knives is provided, the number of which will equal the maximum expected number of segments to be removed from a fruit. The core of a fruit is impaled on a rotatable indexing assembly, whereupon the fruit is carried rectilinearly along the row of knives. Each V-shaped knife cuts a single segment free of both of the associated membranes. The fruit is automatically indexed between cuts, the amount of indexing rotation being controlled by the fruit itself, thereby providing automatic adjustment for segment size. When the fruit reaches the end of the row of knives, all of the segments will have been separated from their respective membranes. The progressive, rapid and straight line action characteristic of the segmenting method of this invention makes possible use of a simply constructed machine for carrying out the invention.

Since the indexing is controlled by the fruit itself, the segmentation will be clean, and very few of the segments will have membranes or portions of membranes attached thereto, upon completion of the segmenting operation.

These and other objects and advantages of the present invention will be apparent from the following description taken in connection with the following drawings in which:

FIGURE 1 is a perspective diagram of an apparatus embodying the invention.

FIGURE 2 is a fragmentary perspective of a portion of the apparatus, showing several knives and a fruit carrier.

FIGURE 3 is an enlarged fragmentary plan of a fruit carrier.

FIGURE 4 is a vertical section taken on line 4—4 of FIGURE 3.

FIGURE 5 is a fragmentary side elevation of the fruit carrier of FIGURE 3.

FIGURE 6 is a side elevation of the rear or trailing blade of the knife used in the apparatus of FIGURE 1 with the front or leading blade broken away.

FIGURE 7 is an elevation of the knife of FIGURE 6 with the front blade shown in full.

FIGURE 8 is a fragmentary perspective showing the cutting action at one of the knives during the sectionizing operation.

FIGURE 9 is a perspective similar to that of FIGURE 8 but taken at a different angle.

FIGURE 10 is a diagrammatic section, taken on line 10—10 of FIGURE 9, showing the relation of the cutting blade, back-up guide, and indexing blade to a fruit.

The diagram of FIGURE 1 shows a complete system for automatically segmenting citrus fruit such as grapefruit. The system includes a segmenting unit S, which operates in conjunction with a feeding unit F and a loading unit L. The feeding and loading units do not form part of the invention and hence are shown diagrammatically. The feeding unit F may be in the form of a conventional belt conveyor 10. Peeled grapefruit G are supplied by the feeding unit to the loading unit L. The loading unit L includes a belt 11 trained over pulleys 12 and 13, pulley 13 being driven by suitable drive means such as a motor 14. Spaced along the belt 11 are fruit grippers 15 which receive fruit supplied from the feeding unit F, and present the fruit to the segmenting unit S.

At the segmenting unit S, each fruit is impaled on a fork mounted on one of a plurality of carriers C. The segmenting unit has a frame 16 in the form of spaced side plates that mount four pulleys 17, around which a belt 18 is passed. The carriers C are mounted on the belt 18 in longitudinally spaced relation. One of the pulleys 17 is driven by a motor and suitable reduction gearing indicated at D. When the belt 18 traverses the upper, horizontal portion of the segmenting unit, the belt is guided by a track 19. Disposed in horizontal spaced relation along this section of the segmenting unit is a row of fixed knives K. As the carriers C pass along the knives, each knife removes one segment from the body of the fruit. The row of knives appears more clearly in FIGURE 2.

The individual segments fall onto the belt 18 and can be pushed off the belt by a series of pusher plates 20 (FIG. 1) operated by solenoids 20a in timed relation with the motion of belt 18. These pusher plates are not considered to be part of the present invention and details thereof are not described. After clearing the upper reach of belt 18, the segments fall to the lower reach of the belt, sliding along deflector plate 21. The segments are scraped off the lower reach of the belt by an inclined scraper blade 22, whereupon they fall into a segment collecting tray 23.

The core of the fruit with the attached membranes, known in the art as the rag, remains impaled upon the indexing mechanism of the carrier. The rag may be removed by a mechanism 24 disposed at the rear of the machine. Since the rag removing mechanism does not form part of the invention, it is only shown diagrammatically. As previously mentioned, the feeding, loading, segment-collecting and rag removing portions of the apparatus are merely shown in the interest of completeness. They are not critical to and do not form part of this invention, which is directed to the segmenting apparatus and the method of removing the segments from the body of the fruit.

Referring now to the construction of the segmenting unit, a fruit carrier assembly C is illustrated in detail in FIGURES 3 to 5. The carrier assembly includes a base plate 26 attached to belt 18, which plate mounts a post 27, and a short longitudinally extending shaft 28 is rotatably mounted in the post. The shaft 28 is axially restrained in the post by collars 29 and 31 pinned to the shaft. A fork 32 is mounted on and secured to the shaft 28, the fork having six axially extending pins 32a for impaling the core of the fruit.

The shaft 28 is rotatably mounted in the post 27 in order that the shaft can turn to index the fruit. Indexing motion of the shaft is caused by an indexing member 33 pinned to the shaft. The indexing member has a thin, forwardly projecting blade portion 34 for insertion between a fruit segment and a membrane. The end of blade 34 is sharpened. A helical spring 36 surrounds the shaft and one end of the spring is fastened to the indexing member 33 whereas the other end of the spring connects to a plate 37 mounted on the carrier post 27. Spring 36 is provided in order to resiliently urge the indexing blade and the fruit mounted on the fork for indexing rotation.

Before cutting is initiated, the impaling pins and the indexing blade assembly is cocked by giving the shaft one or more turns in the direction opposite to that of indexing rotation. A ratchet assembly is provided to hold the assembly in its cocked position. As seen in FIGURE 4, the collar 31 is relieved to provide a shoulder 38. A pawl 39 is pivotally mounted on the post 27 by means of a pin 40, the pawl having a tooth 41 for engaging the shoulder 38 formed on collar 31. A leaf spring 42, mounted on a spring post 43 urges the tooth 41 of the pawl into position to engage the shoulder 38 on the collar. With this arrangement, when the spring 36 is cocked by giving the indexing blade one or more turns, the pawl and collar members will initially hold the assembly in its cocked position against the force of indexing spring 36.

Means are provided to release the pawl and place the indexing apparatus under control of the indexing spring 36, before the cutting operation on the first segment has been completed. As seen in FIGURES 3 and 4, the pawl has a depending finger portion 44 that is positioned in the path of a fixed release cam 46 mounted on the guide channel 19. As indicated in FIGURE 2, release cam 46 is longitudinally positioned relative to the first knife so that the indexing member 34 is unlatched while the first segment of the fruit is being cut from the fruit, preferably just before the cutting operation being performed on the first segment has been completed.

One of the V-shaped knives forming part of the apparatus is shown separately in FIGURES 6 and 7, and the knife mounting is best seen in FIGURES 4, 8, and 9. The knife has two blades which diverge at an angle of about 30° in order to segment fruit having about 12 segments. The rear or trailing blade 47 of the knife is supported on a knife mounting bar 48 (FIG. 4) which is supported by a plate 48a that extends upwardly from belt guide 19. A knife clamping plate 49 is provided, and the rearward blade 47 has an apertured ear or extension 50 that fits under the plate 49. A clamp bolt 51 is threaded into bar 48 for mounting the knife assembly.

The rear knife blade 47 has a sharpened edge 52 that tapers toward a nose or point 53 at the leading or penetrating end of the blade. The outer, or leading blade 54 of the knife likewise has a sharpened edge 56 tapering toward the nose 53. It will be seen in FIGURE 7 that the sharpened edge 52 of the rear blade 47 has a portion 52a that is somewhat advanced relative to the portion 56a of the sharpened edge 56 of the front blade 54. This arrangement of the cutting edges of the two blades of the knife provides a progressive entry and cutting action that requires a minimum of penetrating force during the segmenting operation. The contour of the rear blade 47 is such that it gives the rear blade sufficient surface to adequately support the fruit against the indexing force imparted to the fruit by the indexing blade and the indexing spring.

Means are provided to support the indexed fruit between cuts while permitting separation of the membrane from the associated segment. This is accomplished by providing resiliently mounted fruit back-up guides. Referring to FIGURES 7 and 9, each front or leading blade 54 is formed with hinge elements 58 on its rearward vertical edge for mounting a fruit back-up guide 61. Each back-up guide has complementary hinge elements 62 formed on its forward vertical edge (FIG. 9), and a hinge pin extends through the hinge elements 58 and 62 to mount the back-up guide on the blade. The back-up guides bridge adjacent knives and the rearward free ends of the back-up guides are resiliently urged against the front or leading knife blades 54 by coil springs 63 connected between the back-up guides and the knife mounting bar 48. The back-up guides serve to support the fruit against the force of the indexing spring 36 when the fruit is disposed between a pair of knives.

As indicated diagrammatically in FIGURE 1, a unit 66 may be provided at the lower reach of belt 18 for cocking the index blades before the carriers reach the loading station. Since the details of such cocking mechanism do not form part of the invention they are not illustrated, and, in fact, the blades could be moved to the cocked position of FIGURE 4 by hand.

The operation of the segmenting device is best illustrated in FIGURES 8 and 9 and the disposition of the parts during operation also appears in the diagram of FIGURE 10. Referring first to FIGURE 10, the fruit has juice cell groups or segments 67, one segment 67a being disposed between the knife blades. There are membranes 68 between each segment, and there is a core 69 which is impaled by the pins 32a. The indexing blade 34 tends to rotate the fruit in the direction of the arrow.

When a fruit is being mounted on the cocked indexing assembly and the pins 32a penetrate the core of the peeled fruit, the indexing blade 34 cuts into the fruit between the segment aligned with the first knife blade 54 and the leading membrane for that segment. The indexing blade is initially disposed on the outside of the leading knife blade 54, as indicated in FIGURE 10, it being noted that in this figure, two segments have been previously removed. As the carrier C approaches the first knife, the tip 53 of the knife slides between two adjacent membranes and cutting begins. Then, as the carrier C is advanced past the first knife, the segment being severed is separated from both adjacent membranes, as indicated in FIGURE 10. The fruit is initially held in position by the ratchet mechanism but before the first cut has been completed the pawl 39 is released by cam 46 whereupon the force of indexing spring 36 is borne by the rear knife blade 47.

As soon as the fruit has passed the first knife, the segment 67b next to the one just removed is no longer supported by the rear knife blade 47 and the indexing blade 34 turns the fruit through an angle corresponding to that of the removed segment. This brings the leading membrane of the segment 67b against the back-up guide 61, before the fruit reaches the next knife. When the segment reaches the tip of the next knife, the tip of the knife tends to ride between the membranes since the membranes are tougher than the segments.

As best seen in FIGURE 9, as cutting proceeds, the membrane 68 on the leading side of the segment that is being severed passes between the outside of knife blade 54 and adjacent surface of the back-up guide 61, the coil spring 63 accommodating the required slight deflection of the back-up guide. The severed segment remains between the blades of the knife and the segment of a succeeding fruit pushes the cut segment longitudinally through the blades so that it drops onto the belt 18 or falls below it, as illustrated in FIGURE 1. The cutting and self-indexing actions continue automatically as the fruit is advanced from one knife to the next. To insure that all segments of a fruit will be removed, all that is necessary is that enough knives be provided to dispose of fruit having the maximum number of segments. With grapefruit at least 12 knives will usually be required.

Thus, if a knife having an included blade angle of 30° is selected, this angle will match closely the angularity of the segments of most grapefruit. Even if there are more than 12 segments in a fruit, so that the segments have an included angle that is slightly smaller than 30°, the knives, because of their tapered nose construction, will readily enter between two membranes and will merely spread the leading or outer membrane relative to the segment, to accommodate the body of the knife. In case the segments of the fruit have an angle that is somewhat greater than the knife angle, this merely means that a small part of the fruit will be left attached to the membranes, such waste being relatively small.

In conclusion, it will now be apparent that under this invention, every segment is individually and automatically removed in a progressive, straight line machine, and a single pass of the machine separates all the segments of the fruit. There is a minimum of mutilation and bruising of the segments so that a highly marketable product is produced.

The invention having thus been described, that which is believed to be new and desired to be protected by Letters Patent is:

We claim:

1. The method of separating the juice cell segments of a peeled citrus fruit from their radial boundary membranes comprising the steps of axially impaling the fruit core while accommodating rotation of the fruit about its axis, providing continuous relative longitudinal motion in the cutting direction between the fruit and a row of longitudinally spaced knives to separate a single segment from an associated membrane, turning the fruit through an angle corresponding to that of a segment just removed after separation of that segment to present to a succeeding knife a new segment adjacent to the segment removed by the previous knife, and continuing said segment separating and fruit turning steps until all segments of the fruit have been separated from their membranes.

2. The method of separating the juice cell segments of a peeled citrus fruit from their radial boundary membranes comprising the steps of impaling the fruit core while accommodating rotation of the fruit about its axis, providing relative longitudinal motion between the fruit and a row of diverging blade cutters to separate a segment from its associated membranes, resiliently urging the segment adjacent to that being separated against an outer wall of the associated knife, indexing the fruit about its axis after separation of each segment and with the fruit disposed between adjacent knives to present to a succeeding cutter a new segment adjacent to the segment removed by the previous knife, and continuing said segment separating and fruit indexing steps until all segments of the fruit are separated from their membranes.

3. The method of separating the juice cell segments of a peeled citrus fruit from their radial boundary membranes comprising the steps of axially impaling the fruit core while accommodating rotation of the fruit about its axis, moving said fruit unidirectionally along its axis and relative to a row of fixed longitudinally spaced knives to successively separate individual segments from their associated membranes, indexing the fruit about its axis after separation of each segment by backing up a new segment to be removed in the zone of the segment just removed by the previous knife when the fruit is between adjacent knives, presenting the new segment to the succeeding knife, and continuing said unidirectional fruit movement, segment separating and fruit indexing steps until all segments of the fruit are separated from their membranes.

4. The method of separating the juice cell segments of a peeled citrus fruit from their radial boundary membranes comprising the steps of axially impaling the fruit core while accommodating rotation of the fruit about its axis, moving said fruit relative to a row of fixed longitudinally spaced knives in a single direction relative to the fruit axis to successively separate individual segments from their associated membranes, resiliently urging the fruit for rotation about its axis to turn the fruit after separation of each segment and to present to a succeeding knife a new segment adjacent to the segment removed by the previous knife, restraining said fruit from rotation when disposed between adjacent knives by backing up each new segment to be cut in the zone of the segment just removed, and continuing said fruit movement, segment separating and fruit indexing steps until all segments of the fruit are separated from their membranes.

References Cited by the Examiner

UNITED STATES PATENTS 3,081,805   3/1963   Shrewsbury _____ 146—3

WILLIAM W. DYER, Jr., *Primary Examiner.*

W. GRAYDON ABERCROMBIE, *Examiner.*

UNITED STATES PATENT OFFICE
CERTIFICATE OF CORRECTION

Patent No. 3,314,462                             April 18, 1967

Henry A. Oldenkamp et al.

It is certified that error appears in the above identified patent and that said Letters Patent are hereby corrected as shown below:

Column 5, line 51, beginning with "2. The method", strike out all to and including "their membranes." in column 6, line 12; column 6, line 13, for "3." read -- 2. --; same column 6, line 29, for "4." read -- 3. --; in the heading to the printed specification, line 9, for "4 Claims" read -- 3 Claims --.

Signed and sealed this 22nd day of July 1969.

(SEAL)
Attest:

Edward M. Fletcher, Jr.                          WILLIAM E. SCHUYLER, JR.
Attesting Officer                                       Commissioner of Patents